Patented Dec. 7, 1943

2,336,388

UNITED STATES PATENT OFFICE 2,336,388

BONDING RUBBER TO ALUMINUM

Murray C. Beebe, Mount Carmel, Conn., assignor to Scovill Manufacturing Company, Waterbury, Conn., a corporation of Connecticut No Drawing. Application December 5, 1939, Serial No. 307,721

6 Claims. (Cl. 154—2)

This invention or discovery relates to bonding rubber to aluminum; and it comprises a method of effecting a firm and permanent cohesive bond between rubber and aluminum where an aluminum alloy article is kept in a hot dilute solution containing an extensively hydrolyzed aluminum salt until the surface, as evidenced by a change in appearance, is altered with production of an aluminous film deposit, that is alumina containing minor amounts of modifying substances, the modifying substance coming from the solution or from the alloy and being sometimes phosphoric acid and sometimes copper, iron, nickel or cobalt, and the treated article is removed, washed, dried, coated with rubber or synthetic rubber cement and further layers of rubber or similar plastic such as neoprene affixed; and it further comprises an aluminum article carrying thereon an aluminous deposit fromed thereon from a hydrolyzed aluminum salt solution and characterized by coherence with rubber-like plastics; all as more fully hereinafter set forth and as claimed.

The difficulty of uniting rubber to aluminum is well known. Many methods have been proposed for securing an effective cohesive union resisting stripping; but they are not reliable. In applying rubber to articles subjected to mechanical stresses an absolute bond is necessary; the bond must be at least equal in strength to the tearing strength of the rubber itself. Articles of metallic aluminum carry a thin dense coating of oxide and to this oxide coating rubber does not cohere. Since aluminum is almost always alloyed to give it strength and hardness, the oxide coating is rarely pure; it contains oxides of some of the alloy constituents as well. Methods of bonding rubber to metals have been proposed which involve a slight etching or roughening of the metal surface. This is highly undesirable in such articles as airplane propellers, where etching or roughening of the aluminum surface may cause a serious degradation of the physical properties of the propeller. A roughened aluminum structural member is much more subject to fatigue than a polished one.

I have found as a surprising fact that if an aluminum surface be given a further treatment depositing an aluminous film from a highly hydrolyzed solution, on washing and drying, bonding to rubber is readily effected. It appears essential that the deposited alumina be not altogether pure and in one of the effective deposits I have formed there is a little phosphoric acid; about 1 per cent of that part of the coating which can be stripped from the treated aluminum by the use of weak nitric acid. Weak nitric acid does not affect the primary oxide coating of the aluminum but it does take into solution, the oxidic coating which is produced in the present process. The presence of some copper greatly facilitates deposition of the coating as does a small amount of phosphate.

In practice, in one of the best embodiments of my invention which I now know, phosphate of alumina is brought into solution with oxalic acid to make a relatively concentrated stock solution. The amount of oxalic acid is just about that which is necessary to bring the phosphate into solution. About 0.2 per cent, by volume, of this solution is added to water to form a treating bath, and enough ammonia added to cause extensive hydrolysis. The aluminum parts are first subjected to a nitric acid pickle or a suitable buffing operation with a greaseless rouge. They are then immersed in the hot treating bath for about a half hour; until a thin coating is formed, a coating which can be stripped with nitric acid. Experience shows that treatment in baths of this concentration, at temperatures around 160° to 180° F., for the length of time indicated, gives coatings of the desired thickness. The progress of the change, in this case, is shown by the development of a blackish color. This may be due to silica derived from the aluminum article itself; or perhaps to the presence of iron existing as an impurity in commercial aluminum phosphates. The best temperature of this bath is about 160° F. This bath is even more effective when it contains a small amount of dissolved copper, which is conveniently added to the bath in the form of copper hydroxide, copper sulfate, copper phosphate or copper thiocyanate. The hydroxide is the cheapest of these compounds. Copper hydroxide serves well in baths for treating articles for a neoprene bond, but copper thiocyanate is advantageous in treating articles for bonding with rubber.

The treated parts are now washed and dried and area ready for application of rubber. Cohesion is excellent. The strength of the aluminum part is in no way lessened by the treatment. The aluminum is substantially not attacked.

In operating as described above, the coating film produced, yields when stripped with nitric acid and subjected to analysis, about 70 per cent Al, 1 per cent P, 6.5 per cent Cu, and the balance mostly O. The film is doubtless hydrated to some extent. The exact chemical constitution of the film is not known.

The concentration of alumina in the working bath is rather critical. The optimum proportion corresponds to about 0.8 gram dissolved alumina (calculated as $Al_2O_3$) per liter of working solution. Concentrations much greater or less than this are less effective.

The original stock solution can be phosphate free; it can consist of aluminum hydroxide dissolved in oxalic acid. It is questionable whether a true solution of alumina is produced in such case, either in the stock solution or in the dilute bath; the alumina probably exists in colloid suspension as a dispersoid phase. In any event such baths give good results. In these phosphate-free baths the presence of dissolved copper is particularly desirable.

In lieu of copper, or in addition thereto, the bath can contain dissolved iron, nickel or cobalt, with comparable results. In baths containing iron, cobalt or nickel for co-precipitation with the alumina, and not containing copper, the presence of phosphate in the bath is especially advantageous. The bath need not contain phosphates if copper is present together with the iron, nickel or cobalt. In all cases the added substance is co-precipitated with the alumina deposition, and plays some function in the coherence of the rubber in the rubber bond.

As stated, in making up the working solution or bath from the stock solution, enough ammonia is added to the diluted stock to bring about extensive hydrolysis; to produce a liquid which is, so to speak, in a state of incipient flocculation. The first effect of the addition is to clear up the phosphate solution which is sometimes turbid and actual flocculation does not occur until the bath is in use. The ammonia should be added to the dilute solution of aluminum salt, rather than to the stock solution itself. However, the copper, when employed, can be combined with ammonia, and an ammoniacal stock solution can be made up directly by adding ferric ammonium citrate to an aluminum hydroxide, oxalic acid stock solution.

While aluminum phosphate and aluminum hydroxide are good sources of alumina for my purposes, the alumina can be derived from various other sources. I have secured good results with baths made by dispersing or hydrolyzing ordinary clay (a hydrated aluminum silicate) in a suitable ammoniacal solution.

In routine operation, articles are treated in the bath until it no longer deposits a film of the requisite uniformity and thickness within a reasonable time. While the bath can be replenished and used indefinitely, it is usually more economical simply to discard it when exhausted. The ingredients are cheap.

In a specific example illustrative of one good mode of carrying out the invention, a stock solution was prepared by dissolving 40 parts commercial aluminum phosphate in a solution of 20 parts oxalic acid in 100 parts water; all by weight. Two parts by volume of this solution were added to 750 parts water, and ammonia added; about 17 parts by volume of concentrated ammonia liquor (CP). Then 0.5 part by weight of copper hydroxide was dissolved in the bath, and the temperature brought to 180° F.

The inner or hub portion of an aluminum alloy propeller blade was buffed with a greaseless buffing compound containing alumina as the abrasive and was suspended in the hot bath for some 20 minutes, until it took on a uniform dark coloration. The blade was then rinsed and dried, and a coating of neoprene cement applied. After the solvent had evaporated, a thin sheet of neoprene was laid over the cement on the part of the blade which was to be provided with a fairing. Then the blade was put in a mold of suitable contour, with cellular rubber in uncured state, and subjected to heat and pressure to cure the rubber. The cellular rubber was then covered with a layer of non-porous neoprene and removed to a finishing mold of contour conforming to the desired fairing. Heat and pressure were applied and the blade then removed. The fairing was satisfactory in every respect and coherence with the metal blade exceeded the breaking strength of the rubber.

Another good bath is made up by adding 2 parts by volume of the aluminum phosphate oxalic acid solution to 750 parts water, adding 17 parts concentrated ammonia by volume and adding 0.5 part copper thiocyanate by weight. An equal weight of ferric ammonium citrate can be substituted for the copper thiocyanate.

In all cases the coating builds up gradually, when the article is put in the bath, and the operation can be arrested at any stage to give a coating of the desired thickness. With the concentrations mentioned, and working at the elevated temperatures described, dipping times of the order of a half-hour or less are ordinarily employed.

Aluminum articles treated according to the invention are adapted for coherence with rubber and the various synthetic rubbers, modified rubbers (vulcanized rubber, chlorinated rubbers, rubber hydrochlorides, etc.) and rubber-like plastics. The neoprenes are polymerized chlorobutadienes and are sometimes called polychloroprenes or chloroprenes. Other rubber substitutes useful in the invention are the butadiene rubbers: butadiene-acrylic-acid-nitrile mixed polymerizate, sold as Perbunan or Buna N. Neoprene is particularly useful for propeller fairings because of its resistance to weather and sunlight and its oil-resistant properties. Other things being equal, it is best to apply the rubber, etc. to the aluminum article soon after the alumina coating operation.

The bond between the rubber and the aluminum is so good as to open up new fields of utilization for aluminum. Thus, I can make a honeycomb-type radiator core by providing a series of aluminum tubes with enlarged end portions of square or hexagonal section, treating the end portions with an aluminous bath according to the invention, applying plastic neoprene to the end portions and assembling the tubes in a stack. The resulting radiator core is tight to water, glycol and other coolants, and is vibration resistant. The neoprene in this connection may be regarded as a sort of organic solder. Laminated structures can be built up along the same lines.

What I claim is:

1. A method of bonding, to the surface of aluminum articles, a plastic selected from the class consisting of rubber, vulcanized rubber, chlorinated rubber, rubber hydrochloride, polymerized chlorobutadienes and butadiene co-polymers, which comprises subjecting the surface of an aluminum article to the action of a dilute solution of alumina dissolved in organic acid and dispersed in ammonia, said solution containing a small amount of a dissolved compound of metal selected from the class consisting of Cu, Co, Ni and Fe, until a coherent film is formed on said surface, drying, applying to the dried article a coating of a cement capable of adhering to the filmed article and to a plastic of said class, and applying a layer of said plastic in adherent relation to the cement coated article.

2. The method of claim 1 wherein the bath contains alumina in proportion equivalent to 0.8 gram $Al_2O_3$ per liter.

3. The method of claim 1 wherein the bath contains a dissolved phosphate.

4. A method of bonding, to the surface of aluminum articles, a plastic selected from the class consisting of rubber, vulcanized rubber, chlorinated rubber, rubber hydrochloride, polymerized chlorobutadienes and butadiene co-polymers, which comprises subjecting the surface of an aluminum article to the action of a dilute solution of alumina dissolved in oxalic acid and dispersed in ammonia and containing a small amount of a dissolved copper compound, until a coherent film is formed on said surface, drying, applying to the dried article a coating of a cement capable of adhering to the filmed article and to a plastic of said class, and applying a layer of said plastic in adherent relation to the cement coated article.

5. A method of bonding, to the surface of aluminum articles, a plastic selected from the class consisting of rubber, vulcanized rubber, chlorinated rubber, rubber hydrochloride, polymerized chlorobutadienes and butadiene co-polymers, which comprises subjecting the surface of an aluminum article to the action of a dilute bath containing a hydrolyzed aluminum compound, oxalic acid, ammonia and a small amount of a dissolved compound of a metal selected from the class consisting of Cu, Co, Ni and Fe, until a coherent film is formed on the surface of the article, drying, applying to the dried article a coating of a cement selected from the class consisting of neoprene cement and rubber cement and applying a layer of said plastic in adherent relation to the cement coated article.

6. An aluminum article bearing a dark, coherent, aluminous surface film resulting from the action of a dilute solution of alumina dissolved in acid and dispersed in ammonia, said solution containing a small amount of a dissolved compound of a metal selected from the class consisting of Cu, Fe, Co and Ni, a coherent coating on said film of a cement selected from the class consisting of rubber cement and neoprene cement; and on said coating a coherent layer of a plastic selected from the class consisting of rubber, vulcanized rubber, chlorinated rubber, rubber hydrochloride, polymerized chlorobutadienes and butadiene co-polymers.

MURRAY C. BEEBE.